(12) United States Patent
Krishna Singuru

(10) Patent No.: US 10,656,980 B2
(45) Date of Patent: May 19, 2020

(54) METHOD AND SYSTEM FOR PROCESSING DATA IN A SERVERLESS COMPUTING ENVIRONMENT

(71) Applicant: Wipro Limited, Bangalore (IN)

(72) Inventor: Radha Krishna Singuru, Hafeez pet (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/049,847

(22) Filed: Jul. 31, 2018

(65) Prior Publication Data
US 2019/0384655 A1  Dec. 19, 2019

(30) Foreign Application Priority Data
Jun. 18, 2018 (IN) .............................. 201841022643

(51) Int. Cl.
*G06F 3/00* (2006.01)
*G06F 9/44* (2018.01)
(Continued)

(52) U.S. Cl.
CPC ................ *G06F 9/542* (2013.01); *G06F 8/60* (2013.01); *G06F 16/24578* (2019.01); *G06F 16/285* (2019.01); *G06N 20/00* (2019.01)

(58) Field of Classification Search
CPC ...................................................... G06F 9/542
(Continued)

(56) References Cited

U.S. PATENT DOCUMENTS 9,286,571 B2  3/2016 Cao et al.
2005/0288961 A1  12/2005 Tabrizi
(Continued)

FOREIGN PATENT DOCUMENTS

EP  2 410 427 A1  1/2012

OTHER PUBLICATIONS

MSV, J, "How Edge Computing and Serverless Deliver Scalable Machine Learning Services", https://www.forbes.carry/sites/janakirammsv/2017/04/16/how-edge-computing-and-serverless-deliver-scalable-machine-learning-services/#7b6079f92ebd, 2017. pp. 1-5.

(Continued)

*Primary Examiner* — Timothy A Mudrick
(74) *Attorney, Agent, or Firm* — Finnegan, Henderson, Farabow, Garrett & Dunner, LLP

(57) ABSTRACT

Disclosed herein is method and system for processing data in serverless computing environment. In an embodiment, information related to functions associated with plurality of serverless computing platforms and the data to be processed are received from data sources. Thereafter, processing operations required for processing the data are determined based on characteristics of data and domain related to data. Further, confidence scores for each function is determined by correlating processing operations and information related to functions. A target function for performing processing operations is identified based on evaluation of confidence scores, and the target function is deployed by forwarding data to serverless computing platform associated with the target function. Finally, the data is processed when an event is triggered for processing the data by target function. In an embodiment, present disclosure eliminates need to create and maintain servers by dynamically selecting an optimal serverless computing platform for processing the data.

18 Claims, 4 Drawing Sheets

(51) Int. Cl.
    *G06F 9/46*          (2006.01)
    *G06F 13/00*        (2006.01)
    *G06F 9/54*          (2006.01)
    *G06F 16/28*        (2019.01)
    *G06N 20/00*       (2019.01)
    *G06F 16/2457*    (2019.01)
    *G06F 8/60*          (2018.01)

(58) Field of Classification Search
    USPC .......................................................... 719/318
    See application file for complete search history.

(56) References Cited

U.S. PATENT DOCUMENTS

2011/0282975 A1* 11/2011 Carter ................... G06F 9/5055
                                                                   709/220
2019/0205184 A1* 7/2019 Zhang ................... G06F 9/5083

OTHER PUBLICATIONS

Shah, K., "Serverless computing: Predictions for 2017", https://velotio.com/blog/2017/1/24/serverless-computing-predictions-for-2017, 2017. pp. 1-8.

* cited by examiner

METHOD AND SYSTEM FOR PROCESSING DATA IN A SERVERLESS COMPUTING ENVIRONMENT

TECHNICAL FIELD

The present subject matter is, in general, related to serverless computing and more particularly, but not exclusively, to a method and system for processing data in a serverless computing environment comprising a plurality of serverless computing platforms.

BACKGROUND

In a server-based computing environment, once an application gets developed, the next step would be to deploy the application on the servers. Deploying the application on the server includes various steps such as capacity planning, resource procurement, installation of hardware and software and the like, which is a time-consuming process. Also, deploying the applications on the server involves lot of initial set-up expenses and running expenses.

However, the advent of cloud computing has enabled developers to deploy and run the applications on cloud-based servers available on cloud computing environment, rather than the physical servers running at company's site. Further, since the cloud-based servers usually work on principles of sharing of virtual and/or physical resources, they also help in minimizing the expenses involved in setting-up and running applications on the servers.

At present, because of usefulness of cloud computing, data or workloads which are collected at different remote locations are moved to centralized cloud computing environment to process and derive insights from the data. However, this may not be efficient in certain use cases, for example, when the data is huge, critical and time-sensitive. A major drawback of transmitting the collected data to the cloud computing environment is that the data cannot be processed and analyzed in an effective manner at the remote data center. For example, due to inherent latencies in network, the processing of time-critical tasks in the remote data center becomes ineffective, Also, when the data is huge, it may not be practically feasible to transfer the data to distant cloud computing servers because of limitations in terms of size of network and cost of transmitting the data.

The information disclosed in this background of the disclosure section is only for enhancement of understanding of the general background of the invention and should not be taken as an acknowledgement or any form of suggestion that this information forms the prior art already known to a person skilled in the art.

SUMMARY

One or more shortcomings of the prior art may be overcome, and additional advantages may be provided through the present disclosure. Additional features and advantages may be realized through the techniques of the present disclosure. Other embodiments and aspects of the disclosure are described in detail herein and are considered a part of the claimed disclosure.

Disclosed herein is a method for processing data in a serverless computing environment, comprising a plurality of serverless computing platforms. The method comprises receiving, by a serverless orchestrator, information related to each of one or more functions associated with each of the plurality of serverless computing platforms. The information comprises capability of the one or more functions to perform a set of operations when an event is triggered. Further, the method comprises receiving data, to be processed, from one or more data sources associated with the serverless orchestrator. Subsequently, the method comprises determining one or more processing operations to be performed on the data based on one or more characteristics of the data and a domain related to the data. Upon determining the one or more processing operations, the method comprises determining confidence scores corresponding to each of the one or more functions based on correlation between the one or more processing operations and the information related to each of the one or more functions. Thereafter, the method comprises identifying a target function from the one or more functions, which is best suited for performing the one or more processing operations, based on an evaluation of the confidence scores. Further, the method comprises deploying the target function for performing the one or more operations by forwarding the data to a serverless computing platform associated with the target function. Finally, the method comprises triggering an event for processing the forwarded data by the target function.

Further, the present disclosure relates to a serverless orchestrator for processing data in a serverless computing environment comprising a plurality of serverless computing platforms. The serverless orchestrator comprises a processor and a memory. The memory is communicatively coupled to the processor and stores processor executable instructions, which on execution, cause the processor to receive information related to each of one or more functions associated with each of the plurality of serverless computing platforms. The information comprises capability of the one or more functions to perform a set of operations when an event is triggered. Further, the instructions cause the processor to receive data, to be processed, from one or more data sources associated with the serverless orchestrator. Thereafter, the instructions cause the processor to determine one or more processing operations, to be performed on the data, based on one or more characteristics of the data and a domain related to the data. Further, the instructions cause the processor to determine confidence scores corresponding to each of the one or more functions based on correlation between the one or more processing operations and the information related to each of the one or more functions. Upon determining the confidence scores, the instructions cause the processor to identify a target function from the one or more functions, which is best suited to perform the one or more processing operations based on an evaluation of the confidence scores. Further, the instructions cause the processor to deploy the target function to perform the one or more operations by forwarding the data to a serverless computing platform associated with the target function. Finally, the instructions cause the processor to trigger an event to process the forwarded data by the target function.

Furthermore, the present disclosure relates to a non-transitory computer readable medium including instructions stored thereon that when processed by at least one processor cause a serverless orchestrator to perform operations comprising receiving information related to each of one or more functions associated with each of the plurality of serverless computing platforms. The information related to each of one or more functions comprises capability of the one or more functions to perform a set of operations when an event is triggered. Further, the instruction cause the serverless orchestrator to receive data to be processed from one or more data sources associated with the serverless orchestrator. Thereafter, the instructions cause the serverless orchestrator to determine one or more processing operations to be performed on the data based on one or more characteristics of the data and a domain related to the data. Subsequently, the instructions cause the serverless orchestrator to determine confidence scores corresponding to each of the one or more functions based on correlation between the one or more processing operations and the information related to each of the one or more functions. Further, the instructions cause the serverless orchestrator to identify a target function from the one or more functions, which is best suited to perform the one or more processing operations. Identification of the target function is based on an evaluation of the confidence scores. Finally, the instructions cause the serverless orchestrator to deploy the target function to perform the one or more processing operations by forwarding the data to a serverless computing platform associated with the target function and trigger an event to process the forwarded data by the target function.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

Figure 1:
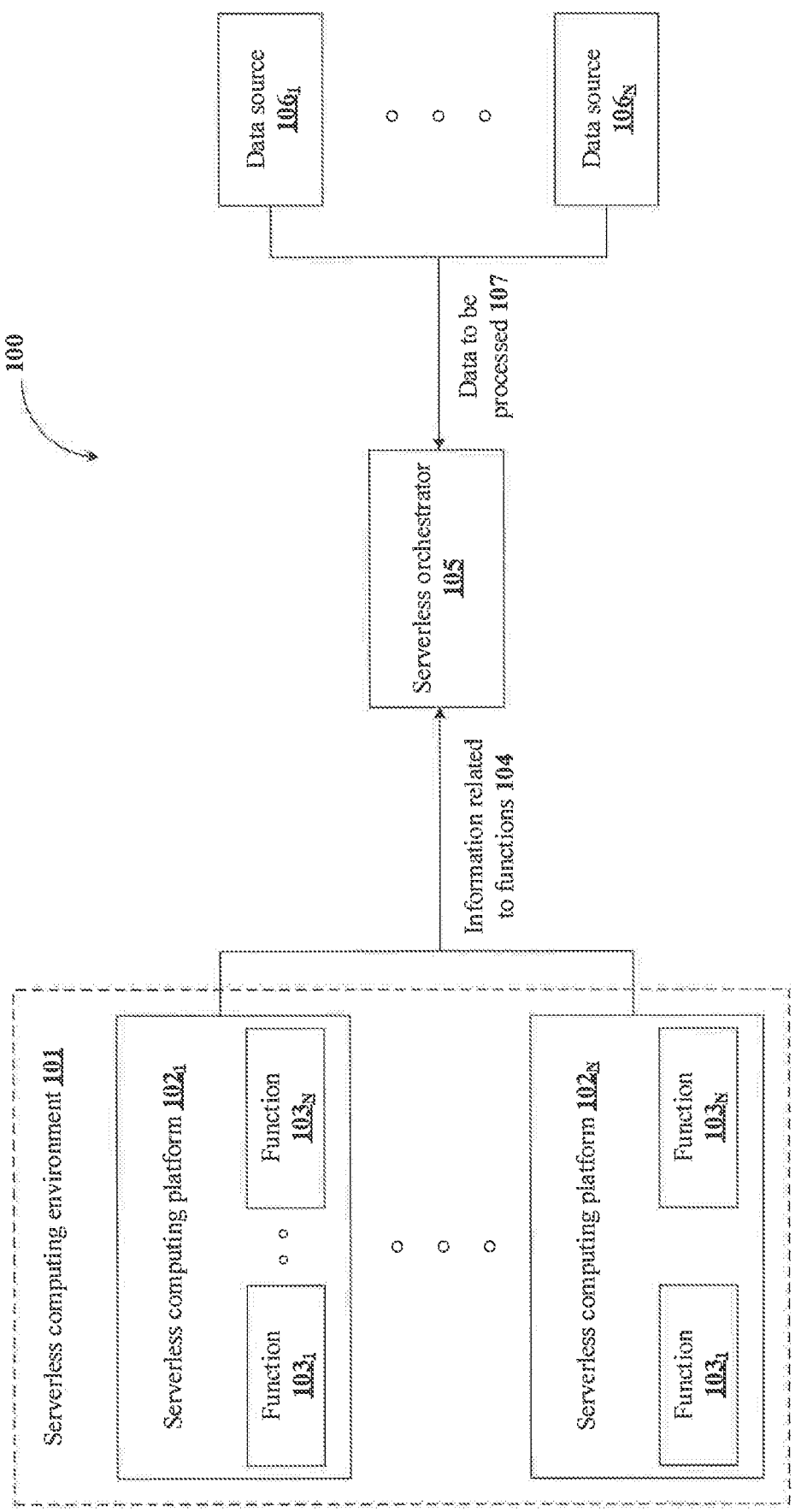
FIG. 1 illustrates an exemplary environment for processing data in a serverless computing environment comprising a plurality of serverless computing platforms in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the spirit and the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a serverless orchestrator for processing data in a serverless computing environment comprising a plurality of serverless computing platforms. In an embodiment, the serverless orchestrator leverages machine learning techniques to dynamically identify an optimal serverless computing platform, among the plurality of serverless computing platforms, for processing the data.

Serverless computing may he perceived as the next step of Platform-as-a-Service (PaaS). The serverless computing may also be referred as Function-as-a-Service (FaaS). Serverless computing works based on stateless compute containers using an event-driven model. It is an approach to software development that attempts to completely eliminate the need for creating and maintaining servers in the form of physical machines, virtual machines or cloud instances. The serverless computing allows the developers to build and run applications and services without the need to manage a server infrastructure, such that developers and testers can quickly run and test applications in the cloud, without going through traditional workflow of cloud based computing. Also, in case of serverless computing, the pricing may be done based on actual amount of time and quantity of resources consumed by an application, rather than on pre-purchased units of capacity. This, in turn, minimizes expenditure associated with testing and/or running applications or services on the serverless computing platforms.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an exemplary environment 100 for processing data in a serverless computing environment 101 comprising a plurality of serverless computing platforms 102 in accordance with some embodiments of the present disclosure.

In some implementations, the environment 100 may include a serverless computing environment 101, a serverless orchestrator 105 and one or more data sources 106. The serverless computing environment 101 may comprise a plurality of serverless computing platforms 102, namely, serverless computing platform $102_1$ to serverless computing platform $102_N$ (hereinafter collectively referred to as plurality of serverless computing platforms 102). In an embodiment, each of the plurality of serverless computing platforms 102 may provide one or more functions, namely, function $103_1$ to function $103_N$ (hereinafter collectively referred to as functions 103). As an example, the plurality of serverless computing platforms 102 may be cloud computing platforms hosted by third-patty cloud service providers such as Amazon® Web Service (AWS®), Microsoft® Azure®, Google® cloud platform and IBM® cloud, which provide serverless computing services through the one or more functions 103.

In an implementation, the one or more data sources 106, namely, data source $106_1$ to data source $106_N$ (hereinafter collectively referred to as data sources 106) may include, without limiting to, one or more sensors or data capturing devices deployed in a site for real-time monitoring and transmission of data, or data storage units that store the data to be processed 107 (alternatively referred to as the data 107).

In an embodiment, the serverless orchestrator 105 may receive information related to each of the one or more functions 104 from the plurality of serverless computing platforms 102 for analyzing capability of the one or more functions 103 to perform a set of processing operations when an event is triggered. As an example, the information related to the one or more functions 104 may include, without limiting to, at least one of runtime support and Service Level Agreement (SLA) support provided by the plurality of serverless computing platforms 102, geographic location of the plurality of serverless computing platforms 102, cost of computation and network latency associated with the plurality of serverless computing platforms 102, and computing resources available on the plurality of serverless computing platforms 102.

In an embodiment, the serverless orchestrator 105 may receive the data to be processed 107 from the one or more data sources 106. Further, the serverless orchestrator 105 may determine one or more processing operations that are required to be performed on the data 107, for processing the data to be processed 107, based on one or more characteristics of the data 107 and a domain related to the data 107. In an embodiment, the domain of the data 107 may be determined based on an application or a task to which the data 107 belongs. As an example, the data 107 received from one or more sensors deployed in a mining site may be considered as relating to a mining domain. Similarly, the data 107 analyzed for estimating weather forecast may be considered as relating to a weather domain.

In an embodiment, upon determining the one or more processing operations to be performed, the serverless orchestrator 105 may correlate the one or more processing operations and the information related to each of the one or more functions 104 for determining confidence scores corresponding to each of the one or more functions 103. In an embodiment, the confidence score of a function may be indicative of the capability of the function to perform the one or more processing operations on the data 107 for processing the data 107.

In an embodiment, upon determining the confidence scores for each of the one or more functions 103, the serverless orchestrator 105 may identify a target function from the one or more functions 103 by evaluating the confidence scores of each of the one or more functions 103. The target function may be a function which is best suited for performing the one or more processing operations on the data to be processed 107. As an example, one of the one or more functions 103 having highest confidence score may be identified as the target function for processing the data 107. In an embodiment, the target function may be a combination of one or more functions 103, which are sourced from two or more distinct serverless computing platforms 102.

In an embodiment, upon identifying the target function, the serverless orchestrator 105 may deploy the target function for performing the one or more processing operations by forwarding the data 107 to a serverless computing platform associated with the target function. Finally, the data 107 forwarded to the target function may be processed by the target function when the event is triggered for processing the data 107. Thus, in summary, the serverless orchestrator 105 identifies one or more functions 103 which may be optimal for performing the one or more processing operations on the data 107, and deploys each of the one or more functions 103 on the respective serverless computing platform from the plurality of serverless computing platforms 102 for efficient processing of the data 107.

Figure 2:
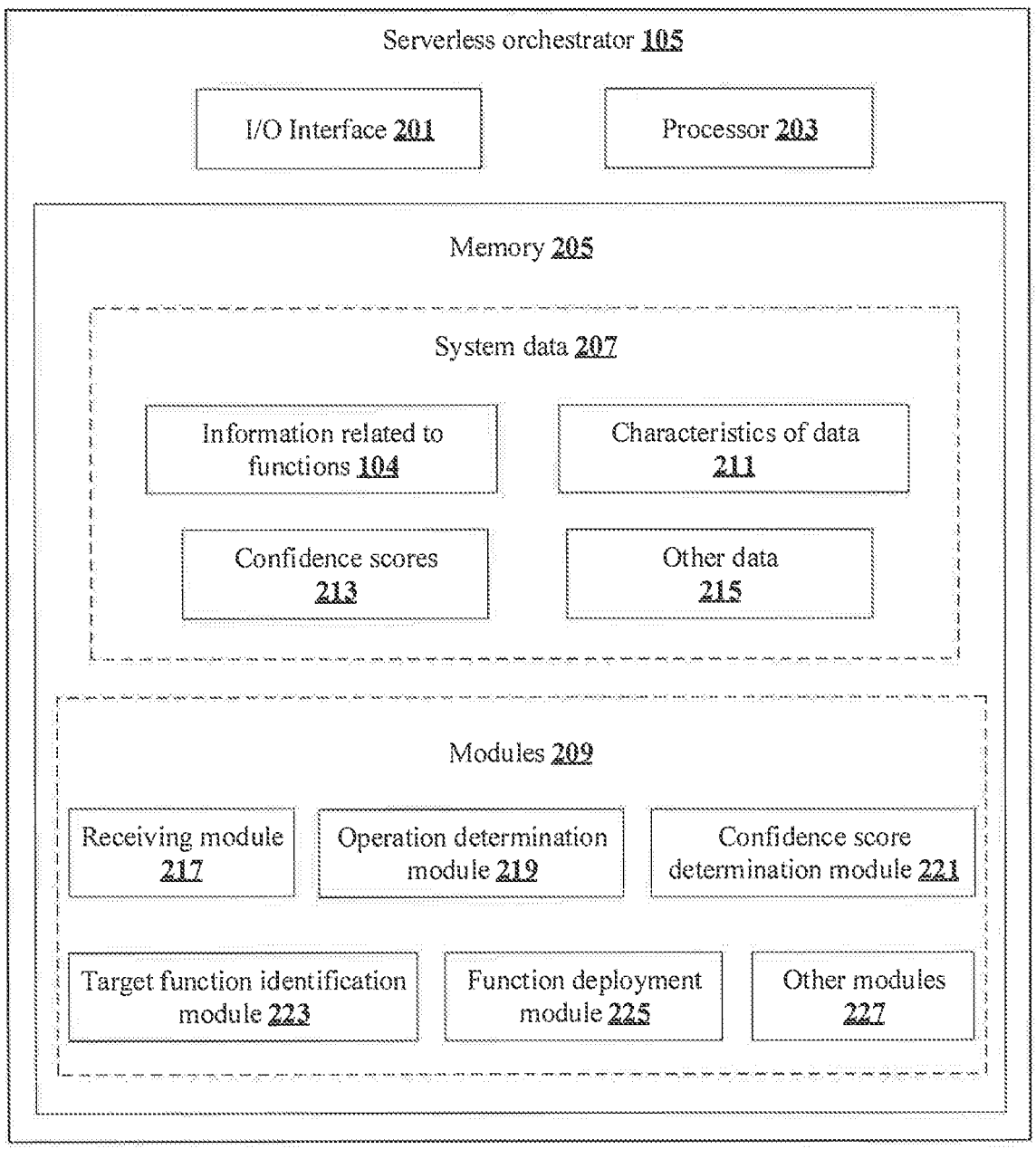
FIG. 2 shows a detailed block diagram illustrating a serverless orchestrator in accordance with some embodiments of the present disclosure.

FIG. 2 shows a detailed block diagram illustrating a serverless orchestrator 105 in accordance with some embodiments of the present disclosure.

In some implementations, the serverless orchestrator 105 may include an I/O interface 201, a processor 203, and a memory 205. The 110 interface 201 may be configured to communicate with plurality of serverless computing platforms 102 for receiving information related to each of one or more functions 104 associated with the plurality of serverless computing platforms 102. Further, the I/O interface 201 may be configured to receive data to be processed 107, from one or more data sources 106 associated with the serverless orchestrator 105. The memory 205 may be communicatively coupled to the processor 203 and may store system data 207 and one or more modules 209. The processor 203 may be configured to perform one or more functions 103 of the serverless orchestrator 105 during processing of the data 107, using the system data 207 and the one or more modules 209.

In an embodiment, the system data 207 may include, without limitation, information related to functions 104, characteristics of data 211, confidence scores 213, and other data 215. In some implementations, the system data 207 may be stored within the memory 205 in the form of various data structures. Additionally, the system data 207 may be organized using data models, such as relational or hierarchical data models. The other data 215 may store data 107 received from the one or more data sources 106 and other temporary data and files generated by one or more modules 209 while performing various functions of the serverless orchestrator 105.

In an embodiment, the information related to the one or more functions 104 may include, without limiting to, at least one of runtime support and Service Level Agreement (SLA) support provided by the plurality of serverless computing platforms 102, geographic location of the plurality of serverless computing platforms 102, cost of computation and network latency associated with the plurality of serverless computing platforms 102, and computing resources available on the plurality of serverless computing platforms 102. The information related to the one or more functions 104 may be used to estimate the capability and/or suitability of the one or more functions 103 to perform a set of operations on the data 107. For example, the information related to the one or more functions 104 such as the SLA offered by a selected function may be compared against the SLA requirements of the processing operations to determine whether the selected function is suitable for processing the data 107. Similarly, the information related to the one or more functions 104 such as geographic location and/or distance, and cost of computation for the selected one or more functions 103 may be analyzed to determine feasibility of using the selected one or more functions 103 for processing the data 107. Thus, the information related to the one or more functions 104 helps in selecting optimal serverless computing platform from the plurality of serverless computing platforms 102 for processing the data 107.

In an embodiment, the information related to the one or more functions 104 may be also used for performing a comparison among the one or more functions 103 and/or the plurality of serverless computing platforms 102. For example, the runtime support provided by the Microsoft® Azure® may include C# and NodeJS as runtime for programming languages. Whereas, the AWS® platform may support Java and Python as the runtime for programming languages. Thus, in this scenario, comparing the runtime support of both the serverless platforms, i.e. Azure® and AWS®, would be helpful to determine the serverless computing platform 102 that best suits the required runtime support.

In an embodiment, the one or more characteristics of the data 211 may be used to determine a domain of the data 107. Also, the one or more characteristics of the data 211 may be used to determine the one or more operations that are required to be performed on the data 107. For example, if the one or more characteristics of the data 211 indicate that the data 107 is complex and time-critical, then the one or more processing operations, which are capable of processing complex, time-critical data may be selected for processing the data 107.

In an embodiment, the one or more characteristics of the data 211 may be determined using a data classification technique, such as logistic regression analysis. For example, consider a use case of an exploratory well, which is drilled to find if there is oil in the well. In such instances, drill tools having a number of sensors may he used to learn about properties of rock while the well is being drilled, to help make on-site drilling decisions like where to steer the tool or when to set casing to seal off formation pressure or when to give up further drilling and the like. Thus, the one or more characteristics of the data 211 collected during this task may include size of the drill hole, shape of the drill hole, geothermal temperature profile, rock density, rock porosity, formation fluid resistivity, and the like. Another use case may be in retail domain, wherein various customer data is collected to understand the consumer behavior. Here, based on the data collected from in-store Point-of-Sale (PoS) systems, online purchase data and loyalty programs, the retailers may analyze the characteristics of the data 211 to derive insights into customer behavior to improve overall shopping experience and to respond to trends and demands in real-time.

In an embodiment, the confidence scores 213 are computed for each of the one or more functions 103 based on correlation between the one or more processing operations selected for processing the data 107, and the information related to each of the one or more functions 104. Alternatively, the confidence scores 213 may he determined based on historical data related to successful processing of the data 107 by the one or more functions 103. i.e., the confidence score for a function may be a higher value, if the function has been successful in processing the data 107 in a predetermined number of previous instances.

In an embodiment, each of the system data 207 may be processed by one or more modules 209 of the serverless orchestrator 105. In some implementations, the one or more modules 209 may be communicatively coupled to the processor 203 for performing one or more functions 103 of the serverless orchestrator 105. In an implementation, the one or more modules 209 may include, without limiting to, a receiving module 217, an operation determination module 219, a confidence score determination module 221, a target function identification module 223, a function deployment module 225, and other modules 227.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. In an embodiment, the other modules 227 may be used to perform various miscellaneous functionalities of the serverless orchestrator 105. It will be appreciated that such one or more modules 209 may be represented as a single module or a combination of different modules.

In an embodiment, the receiving module 217 may be configured for receiving the information related to each of the one or more functions 104 associated with each of the plurality of serverless computing platforms 102 in the serverless computing environment 101. Also, the receiving module 217 may be used for receiving the data to be processed 107 from the one or more data sources 106 associated with the serverless orchestrator 105.

In an embodiment, the operation determination module 219 may be configured for determining the one or more processing operations required for processing the data 107. The operation determination module 219 may determine the one or more processing operations based on the one or more characteristics of the data 211 and a domain related to the data. As an example, in case of data processing in an Oil and Gas domain, the one or more processing operations, which need to be selected for computing reservoir quality may be determined based on capability of the one or more functions 103, providing the one or more processing operations, in computing the reservoir quality. Thus, the operation determination module 219 may determine right set of processing operations for processing the data 107 by mapping the one or more characteristics of the data 211, and the insights and/or results that are required to be derived from the data 107.

In an embodiment, the confidence score determination module 221 may be configured for determining the confidence scores 213 corresponding to each of the one or more functions 103 based on correlation between the one or more processing operations and the information related to each of the one or more functions 104. In an embodiment, the confidence score determination module 221 may classify the data 107, and the information related to each of one or more functions 104 into respective bins associated with the data 107 and the one or more functions 103. Thereafter, the confidence score determination module 221 may establish relationships between the bins corresponding to the data 107 and the bins corresponding to the information, based on one or more inputs received from a user. Subsequently, the confidence score determination module 221 may perform a machine learning on the established relationships to create an ontology of the data 107 and the corresponding function required for processing the data 107.

In other words, the confidence score determination module 221 may use the machine learning model to learn the relationship existing between the data 107, and the information related to each of the one or more functions 104. Subsequently, the confidence score determination module 221 may map the data 107, and the relevant set of functions based on knowledge of relationships, to tag and categorize the data 107. Further, information related to categorization of the data 107 may be fed into a data classification model for determining whether an acceptable level of confidence score may be assigned to the identified set of functions. In an embodiment, machine learning techniques used for establishing the relationships may be reinforced with feedback provided by the user upon completion of the processing of the data 107.

In an embodiment, the target function identification module 223 may be configured for identifying the target function from the one or more functions 103. In an embodiment, the target function identification module 223 may identify the target function based on an evaluation of the confidence scores 213 of each of the one or more functions 103. Initially, the target function identification module 223 may compare the confidence scores 213 of each of the one or more functions 103 with a pre-defined threshold value and rank each of the one or more functions 103 based on the confidence scores 213. Subsequently, the target function identification module 223 may identify the target function from the set of functions based on the ranking.

In an embodiment, the pre-defined threshold value of the confidence score may be use case specific. For example, in some use cases, which involve less-critical data processing operations, a confidence level of 0.7 may be acceptable. Here, the value 0.7 means that the function being selected for processing the data 107 has successfully processed the data in 70% of the times among total number of times it has been selected for processing the data 107. Similarly, for use cases which involve critical data processing operations, a confidence level of 0.9 may be required. In an embodiment, the pre-defined threshold may be adapted based on the inputs provided by the user during processing of the data 107 or based on the feedback provided by the user upon completion of the processing of the data 107.

In an embodiment, when the target function is a combination of the one or more functions 103 sourced from two or more distinct serverless computing platforms from the plurality of serverless computing platforms 102, the confidence score for such a target function may be determined based on a weighted confidence score determined for each of the one or more functions 103 constituting the target function.

In an embodiment, the function deployment module 225 may be configured for deploying the target function for performing the one or more processing operations by forwarding the data 107 to the serverless computing platform associated with the target function. In some implementations, the function deployment module 225 may deploy the target function when an event is triggered for processing the forwarded data 107 by the target function. As an example, the event may be a request/command from the user for processing the data 107.

Figure 3:
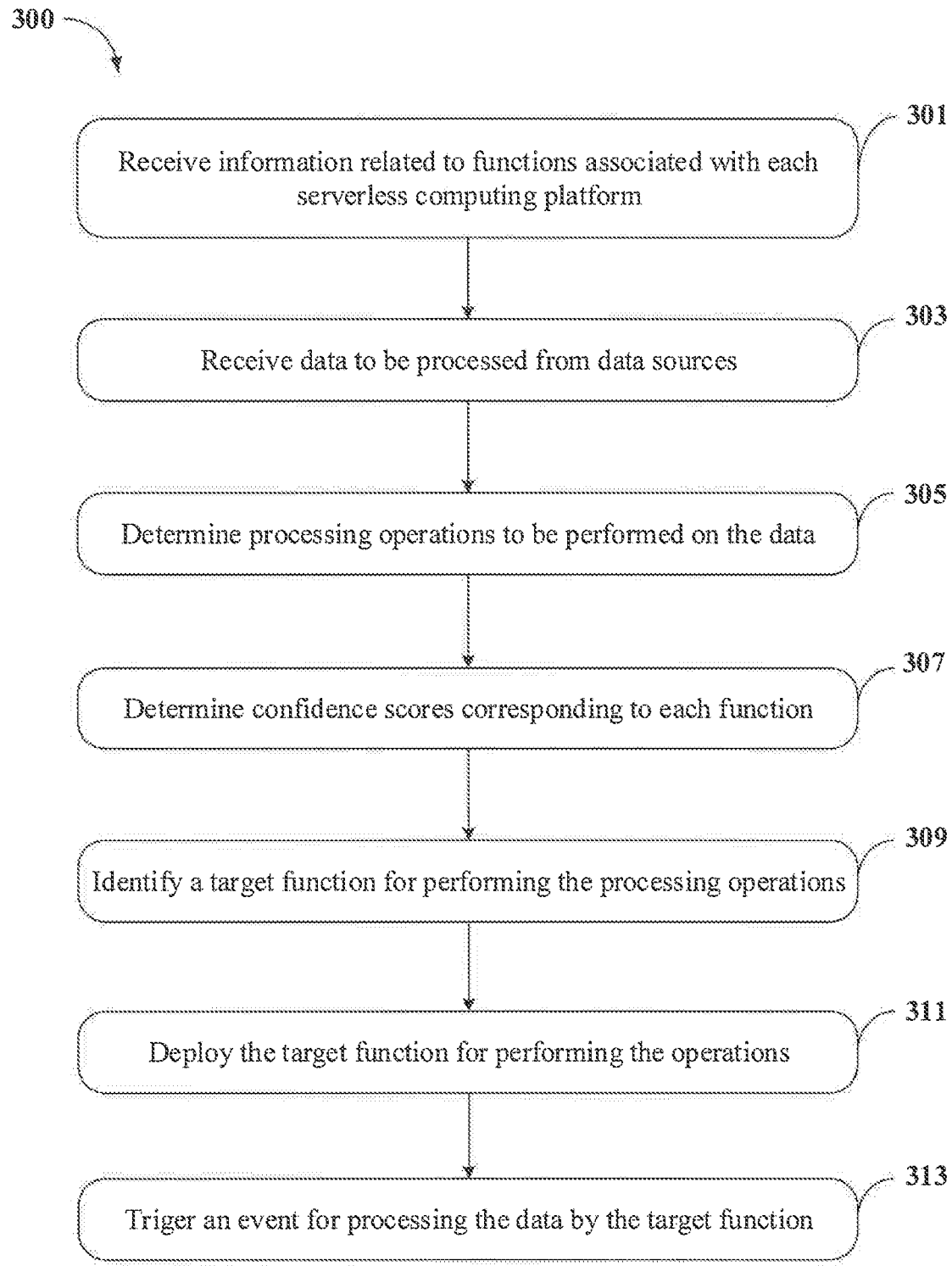
FIG. 3 shows a flowchart illustrating a method of processing data in a serverless computing environment comprising a plurality of serverless computing platforms in accordance with some embodiments of the present invention.

FIG. 3 shows a flowchart illustrating a method of processing data 107 in a serverless computing environment 101 in accordance with some embodiments of the present disclosure.

As illustrated in FIG. 3, the method 300 may include one or more blocks illustrating a method of processing the data 107 using the serverless orchestrator 105 shown in FIG. 1. The method 300 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, the method 300 includes receiving, by the serverless orchestrator 105, information related to each of one or more functions 104 associated with each of the plurality of serverless computing platforms 102. In an embodiment, the information may be related to capability of the one or more functions 103 to perform a set of operations when an event is triggered. As an example, the information related to the one or more functions 104 may include, without limiting to, at least one of runtime support and Service Level Agreement (SLA) support provided by the plurality of serverless computing platforms 102, geographic location of the plurality of serverless computing platforms 102, cost of computation and network latency associated with the plurality of serverless computing platforms 102, and computing resources available on the plurality of serverless computing platforms 102.

At block 303, the method 300 includes receiving, by the serverless orchestrator 105, the data to be processed 107, from one or more data sources 106 associated with the serverless orchestrator 105.

At block 305, the method 300 includes determining, by the serverless orchestrator 105, one or more processing operations to be performed on the data 107 based on one or more characteristics of the data 211 and a domain related to the data 107. As an example, the one or more characteristics of the data 211 may include, without limiting to, at least one of size of the data 107, location of the one or more data sources 106, complexity of the data 1.07, and service-level requirements associated with the data 107.

At block 307, the method 300 includes determining, by the serverless orchestrator 105, confidence scores 213 corresponding to each of the one or more functions 103 based on correlation between the one or more processing operations and the information related to each of the one or more functions 104. In an embodiment, correlating includes classifying the data 107 and the information related to each of one or more functions 104 into respective bins associated with the data 107 and the one or more functions 103. Further, correlating includes establishing relationships between the bins corresponding to the data 107 and the bins corresponding to the information, based on one or more inputs received from user. Furthermore, correlating includes performing a machine learning on the relationships to create an ontology of the data 107 and corresponding function required for processing the data 107.

At block 309, the method 300 includes identifying, by the serverless orchestrator 105, a target function from the one or more functions 103, which is best suited for performing the one or more processing operations. In an embodiment, the target function may be a combination of one or more functions 103 sourced from two or more distinct serverless computing platforms from the plurality of serverless computing platforms 102.

In an embodiment, identification of the target function may be based on an evaluation of the confidence scores 213. In some implementations, evaluation of the confidence scores 213 comprises comparing the confidence scores 213 with a pre-defined threshold, identifying a set of functions from the one or more functions 103 based on the comparison, and ranking each function from the set of functions based on the confidence scores 213. Thereafter, the target function may be identified from the set of functions based on the ranking.

At block 311, the method 300 includes deploying, by the serverless orchestrator 105, the target function for performing the one or more operations by forwarding the data 107 to a serverless computing platform associated with the target function.

At block 313, the method 300 includes triggering, by the serverless orchestrator 105, an event for processing the forwarded data 107 by the target function. In an embodiment, the machine learning techniques used for correlating may be reinforced based on feedback provided by the user upon completion of the processing of the data 107. Constant reinforcement of the machine learning techniques based on the feedback provided by the user or human experts would help in minimizing negative outcomes while identifying the right target function.

Computer System

Figure 4:
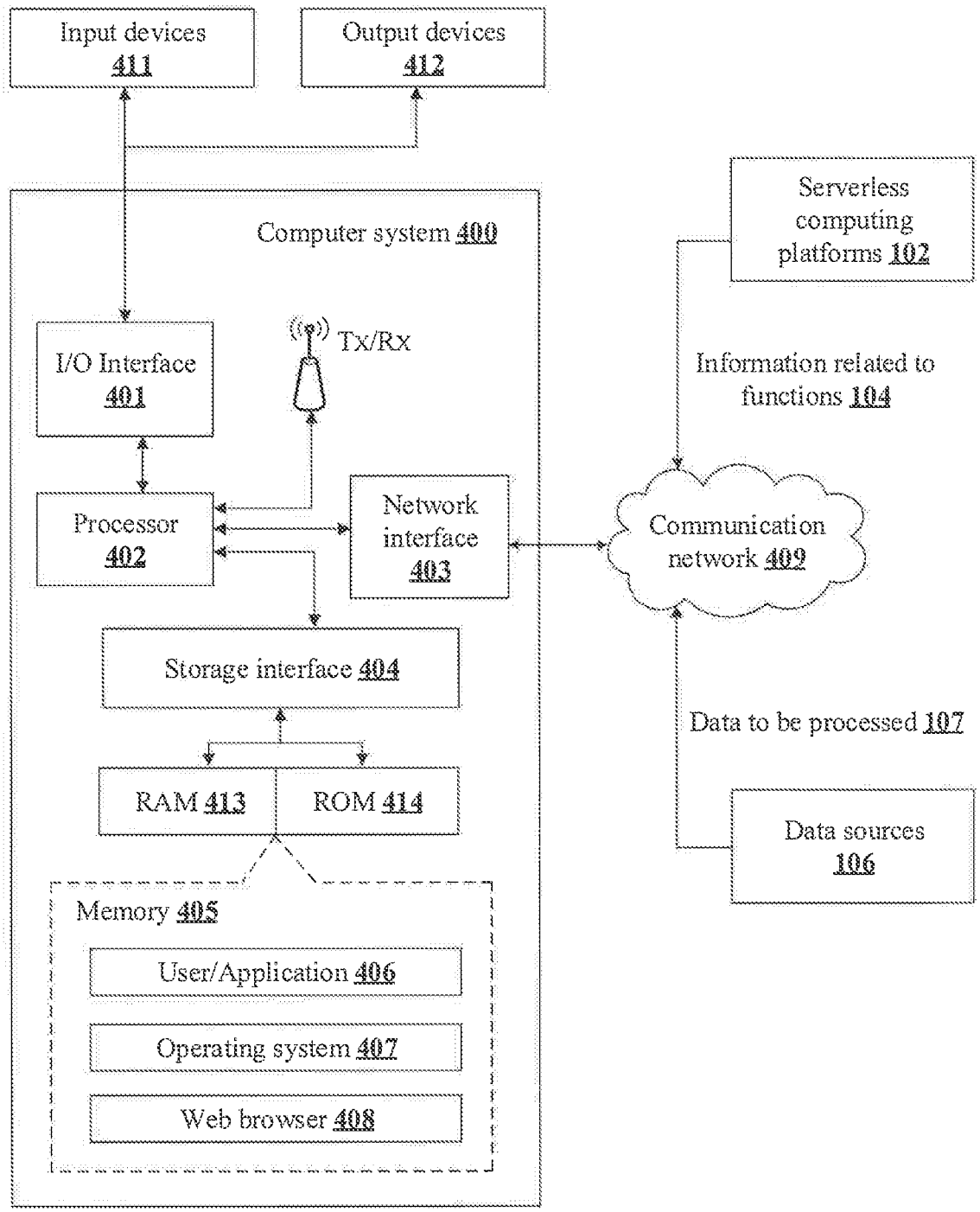
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 may be serverless orchestrator 105 shown in FIG. 1, which may be used for processing data 107 in a serverless computing environment 101. The computer system 400 may include a central processing unit ("CPU" or "processor") 402. The processor 402 may comprise at least one data processor for executing program components for executing user- or system-generated business processes. A user may include a person, a user in the computing environment 100, or any system/sub-system being operated parallelly to the computer system 400. The processor 402 may include specialized processing units such as integrated system (bus) controllers, memory management control units, floating point units, graphics processing units, digital signal processing units, etc.

The processor 402 may he disposed in communication with one or more input/output (I/O) devices (411 and 412) via I/O interface 401. The I/O interface 401 may employ communication protocols/methods such as, without limitation, audio, analog, digital, stereo, IEEE®-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE® 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 401, the computer system 400 may communicate with one or more I/O devices 411 and 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE® 802.11a/b/g/n/x, etc. Using the network interface 403 and the communication network 409, the computer system 400 may receive information related to one or more functions 104 associated with a plurality of serverless computing platforms 102. Further, the communication network 409 may be used for receiving the data to be processed 107 on the serverless computing environment 101, from the one or more data sources 106.

In an implementation, the communication network 409 can be implemented as one of the several types of networks, such as intranet or Local Area Network (LAN) and such within the organization. The communication network 409 may either he a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc.

In some embodiments, the processor 402 may be disposed in communication with a memory 405 (e.g., RAM 413, ROM 414, etc. as shown in FIG. 4) via a storage interface 404. The storage interface 404 may connect to memory 405 including, without limitation, memory drives, removable disc drives, etc., employing connection protocols such as Serial Advanced Technology Attachment (SATA), integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of independent Discs (RAID), solid-state memory devices, solid-state drives, etc.

The memory 405 may store a collection of program or database components, including, without limitation, user/application interface 406, an operating system 407, a web browser 408, and the like. In some embodiments, computer system 400 may store user/application data 406, such as the data, variables, records, etc. as described in this invention. Such databases may be implemented as fault-tolerant, relational, scalable, secure databases such as Oracle® or Sybase®.

The operating system 407 may facilitate resource management and operation of the computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like.

The user interface 406 may facilitate display, execution, interaction, manipulation, or operation of program components through textual or graphical facilities. For example, the user interface 406 may provide computer interaction interface elements on a display system operatively connected to the computer system 400, such as cursors, icons, check boxes, menus, scrollers, windows, widgets, and the like. Further, Graphical User Interfaces (GUIs) may be employed, including, without limitation, APPLE® MACINTOSH® operating systems' Aqua®, IBM® OS/2®, MICROSOFT® WINDOWS® (e.g., Aero, Metro, etc.), web interface libraries (e.g., ActiveX®, JAVA®, JAVASCRIPT®, AJAX, HTML, ADOBE® FLASH®, etc.), or the like.

The web browser 408 may be a hypertext viewing application, Secure web browsing may be provided using Secure Hypertext Transport Protocol (HTTPS), Secure Sockets Layer (SSL), Transport Layer Security (TLS), and the like. The web browsers 408 may utilize facilities such as AJAX, DIITML, ADOBE® FLASH®, JAVASCRIPT®, JAVA®, Application Programming Interfaces (APIs), and the like. Further, the computer system 400 may implement a mail server stored program component. The mail server may utilize facilities such as ASP, ACTIVEX®, ANSI® C++/C#, MICROSOFT®, .NET, CGI SCRIPTS, JAVA®, JAVASCRIPT®, PERU®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, and the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantage of the Embodiment of the Present Disclosure are Illustrated Herein.

In an embodiment, the method of present disclosure uses machine learning techniques to dynamically identify an optimal serverless computing platform, among the plurality of serverless computing platforms, for processing data.

In an embodiment, the method of present disclosure dynamically identifies an optimal function, which is a combination of one or more optimal functions sourced from distinct serverless computing platforms, for efficient processing of the data.

In an embodiment, the method of present disclosure minimizes function warm-up time by automatically selecting the set of functions required for processing the data, thereby reducing expenditure involved in setting-up and running a serverless computing platform.

In an embodiment, the method of present disclosure minimizes network latency involved in transferring the data to be processed to the serverless computing platforms, since one or more serverless computing platforms, which are closer to the sources of data, are selected for processing the data.

The terms "an embodiment". "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Serverless computing environment |
| $102_1$-$102_N$ | Serverless computing platforms |
| $103_1$-$103_N$ | Functions |
| 104 | Information related to functions |
| 105 | Serverless orchestrator |
| $106_1$-$106_N$ | Data sources |
| 107 | Data to be processed |
| 201 | I/O interface |
| 203 | Processor |
| 205 | Memory |
| 207 | System data |
| 209 | Modules |
| 211 | Characteristics of data |
| 213 | Confidence scores |
| 215 | Other data |
| 217 | Receiving module |
| 219 | Operation determination module |
| 221 | Confidence score determination module |
| 223 | Target function identification module |

-continued

| Reference Number | Description |
| --- | --- |
| 225 | Function deployment module |
| 227 | Other modules |
| 400 | Exemplary computer system |
| 401 | I/O Interface of the exemplary computer system |
| 402 | Processor of the exemplary computer system |
| 403 | Network interface |
| 404 | Storage interface |
| 405 | Memory of the exemplary computer system |
| 406 | User/Application |
| 407 | Operating system |
| 408 | Web browser |
| 409 | Communication network |
| 411 | Input devices |
| 412 | Output devices |
| 413 | RAM |
| 414 | ROM |

What is claimed is:

1. A method of processing data in a serverless computing environment comprising a plurality of serverless computing platforms, the method comprising:

receiving, by a serverless orchestrator, information related to each of one or more functions associated with each of the plurality of serverless computing platforms, wherein the information related to each of one or more functions comprises capability of the one or more functions to perform a set of operations when an event is triggered;

receiving, by the serverless orchestrator, data to be processed, from one or more data sources associated with the serverless orchestrator;

determining, by the serverless orchestrator, one or more processing operations to be performed on the data based on one or more characteristics of the data and a domain related to the data;

determining, by the serverless orchestrator, confidence scores corresponding to each of the one or more functions based on correlation between the one or more processing operations and the information related to each of the one or more functions;

identifying, by the serverless orchestrator, a target function from the one or more functions, which is best suited for performing the one or more processing operations, wherein identification of the target function is based on an evaluation of the confidence scores, wherein the evaluation comprises:

comparing the confidence scores with a pre-defined threshold;

identifying a set of functions from the one or more functions based on the comparison;

ranking each function from the set of functions based on the confidence scores; and identifying the target function from the set of functions based on the ranking;

deploying, by the serverless orchestrator, the target function for performing the one or more processing operations by forwarding the data to a serverless computing platform associated with the target function; and triggering, by the serverless orchestrator, an event for processing the forwarded data by the target function.

2. The method as claimed in claim 1, wherein the correlation comprises:

classifying the data, and the information related to each of one or more functions into respective bins associated with the data, and the one or more functions;

establishing relationships between the bins corresponding to the data and the bins corresponding to the information, based on one or more inputs received from a user; and performing a machine learning on the relationships to create an ontology of the data and corresponding function required for processing the data.

3. The method as claimed in claim 2, wherein the machine learning is reinforced with feedback provided by the user upon completion of the processing of the data.

4. The method as claimed in claim 1, wherein the pre-defined threshold is adapted based on the feedback provided by the user upon completion of the processing of the data.

5. The method as claimed in claim 1, wherein the confidence scores corresponding to each of the one or more functions is determined based on historical data related to successful processing of the data by the one or more functions.

6. The method as claimed in claim 1, wherein the target function is a combination of one or more functions sourced from two or more distinct serverless computing platforms from the plurality of serverless computing platforms.

7. The method as claimed in claim 6, wherein the confidence score for the target function is determined based on a weighted confidence score determined for each of the one or more functions constituting the target function.

8. The method as claimed in claim 1, wherein the one or more characteristics of the data comprises at least one of size of the data, location of the one or more data sources, complexity of the data, and service-level requirements associated with the data.

9. The method as claimed in claim 1, wherein the information related to the one or more functions comprises at least one of runtime support and Service Level Agreement (SLA) support provided by the plurality of serverless computing platforms, geographic location of the plurality of serverless computing platforms, cost of computation and network latency associated with the plurality of serverless computing platforms, and computing resources available on the plurality of serverless computing platforms.

10. A serverless orchestrator for processing data in a serverless computing environment comprising a plurality of serverless computing platforms, the serverless orchestrator comprising:

a processor; and a memory, communicatively coupled to the processor, wherein the memory stores processor-executable instructions, which on execution, cause the processor to:

receive information related to each of one or more functions associated with each of the plurality of serverless computing platforms, wherein the information related to each of one or more functions comprises capability of the one or more functions to perform a set of operations when an event is triggered;

receive data to be processed from one or more data sources associated with the serverless orchestrator;

determine one or more processing operations to be performed on the data based on one or more characteristics of the data and a domain related to the data;

determine confidence scores corresponding to each of the one or more functions based on correlation between the one or more processing operations and the information related to each of the one or more functions;

identify a target function from the one or more functions, which is best suited to perform the one or more processing operations, wherein identification of the target function is based on an evaluation of the confidence scores, wherein to evaluate the confidence scores, the processor is configured to:
compare the confidence scores with a pre-defined threshold;
identify a set of functions from the one or more functions based on the comparison;
rank each function from the set of functions based on the confidence scores; and
identify the target function from the set of functions based on the ranking;
deploy the target function to perform the one or more processing operations by forwarding the data to a serverless computing platform associated with the target function; and
trigger an event to process the forwarded data by the target function.

11. The serverless orchestrator as claimed in claim 10, wherein to correlate the one or more processing operations and the information related to each of the one or more functions, the processor is configured to:
classify the data, and the information related to each of one or more functions into respective bins associated with the data, and the one or more functions;
establish relationships between the bins corresponding to the data and the bins corresponding to the information related to each of one or more functions, based on one or more inputs received from a user; and
perform a machine learning on the relationships to create an ontology of the data and corresponding function required for processing the data.

12. The serverless orchestrator as claimed in claim 11, wherein the processor is configured to reinforce the machine learning with feedback provided by the user upon completion of the processing of the data.

13. The serverless orchestrator as claimed in claim 10, wherein the processor is configured to adapt the pre-defined threshold based on the feedback provided by the user upon completion of the processing of the data.

14. The serverless orchestrator as claimed in claim 10, wherein the processor is configured to determine the confidence scores corresponding to each of the one or more functions based on historical data related to successful processing of the data by the one or more functions.

15. The serverless orchestrator as claimed in claim 10, wherein the target function is a combination of one or more functions sourced from two or more distinct serverless computing platforms from the plurality of serverless computing platforms, and wherein the processor is configured to determine the confidence score for the target function based on a weighted confidence score determined for each of the one or more functions constituting the target function.

16. The serverless orchestrator as claimed in claim 10, wherein the one or more characteristics of the data comprises at least one of size of the data, location of the one or more data sources, complexity of the data, and service-level requirements associated with the data.

17. The serverless orchestrator as claimed in claim 10, wherein the information related to the one or more functions comprises at least one of runtime support and Service Level Agreement (SLA) support provided by the plurality of serverless computing platforms, geographic location of the plurality of serverless computing platforms, cost of computation and network latency associated with the plurality of serverless computing platforms, and computing resources available on the plurality of serverless computing platforms.

18. A non-transitory computer readable medium including instructions stored thereon that when processed by at least one processor cause a serverless orchestrator to perform operations comprising:
receiving information related to each of one or more functions associated with each of a plurality of serverless computing platforms, wherein the information related to each of one or more functions comprises capability of the one or more functions to perform a set of operations when an event is triggered;
receiving data to be processed from one or more data sources associated with the serverless orchestrator;
determining one or more processing operations to be performed on the data based on one or more characteristics of the data and a domain related to the data;
determining confidence scores corresponding to each of the one or more functions based on correlation between the one or more processing operations and the information related to each of the one or more functions;
identifying a target function from the one or more functions, which is best suited to perform the one or more processing operations, wherein identification of the target, function is based on an evaluation of the confidence scores, wherein the evaluation comprises:
comparing the confidence scores with a pre-defined threshold;
identifying a set of functions from the one or more functions based on the comparison;
ranking each function from the set of functions based on the confidence scores; and
identifying the target function from the set of functions based on the ranking;
deploying the target function to perform the one or more processing operations by forwarding the data to a serverless computing platform associated with the target function; and
triggering an event to process the forwarded data by the target function.

* * * * *